(12) United States Patent
Jacobs et al.

(10) Patent No.: US 8,596,794 B2
(45) Date of Patent: Dec. 3, 2013

(54) PROJECTION SYSTEM AND PROJECTION SYSTEM WITH LIGHT RECYCLING

(75) Inventors: Stephen M. Jacobs, Cupertino, CA (US); Martin J. Richards, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 246 days.

(21) Appl. No.: 13/119,011

(22) PCT Filed: Sep. 17, 2009

(86) PCT No.: PCT/US2009/057246
§ 371 (c)(1),
(2), (4) Date: Mar. 15, 2011

(87) PCT Pub. No.: WO2010/036554
PCT Pub. Date: Apr. 1, 2010

(65) Prior Publication Data
US 2011/0187715 A1 Aug. 4, 2011

Related U.S. Application Data

(60) Provisional application No. 61/100,251, filed on Sep. 25, 2008.

(51) Int. Cl.
*G03B 21/00* (2006.01)
(52) U.S. Cl.
USPC .......................................................... 353/7
(58) Field of Classification Search
USPC .......................................................... 353/7
See application file for complete search history.

(56) References Cited

U.S. PATENT DOCUMENTS

| | | | |
|---|---|---|---|
| 6,801,263 B2 * | 10/2004 | Sato et al. | 349/15 |
| 2002/0135862 A1 | 9/2002 | Dewald | |
| 2005/0007305 A1 | 1/2005 | Johansen | |
| 2007/0139624 A1 | 6/2007 | DeCusatis | |
| 2008/0278807 A1 * | 11/2008 | Richards et al. | 359/464 |
| 2008/0284982 A1 * | 11/2008 | Richards et al. | 352/38 |
| 2009/0316114 A1 | 12/2009 | Richards | |
| 2010/0013911 A1 * | 1/2010 | Jacobs et al. | 348/54 |
| 2010/0060857 A1 * | 3/2010 | Richards et al. | 353/7 |
| 2010/0066976 A1 * | 3/2010 | Richards et al. | 352/60 |
| 2010/0067108 A1 * | 3/2010 | Richards et al. | 359/464 |

(Continued)

FOREIGN PATENT DOCUMENTS

WO 2005039192 4/2005

OTHER PUBLICATIONS

Dewald, et al., "Sequential Color Recapture and Dynamic Filtering: A Method of Scrolling Color" SID01 Digest, pp. 1076-1079.

*Primary Examiner* — Thanh Luu
*Assistant Examiner* — Renee Naphas

(57) ABSTRACT

A light modulator configured to modulate at least two channels of an image to be projected and a lighting system configured to illuminate portions of the modulator corresponding to each channel with light having properties consistent with the channel. The channels comprise, for example, left and right channels of a 3D projection (e.g., a digital cinema projection). In one embodiment, the channels are provided by a multi-sectored filter wheel having at least one filter section for a first channel and at least one filter section for a second channel, where boundaries between the sectors are different in each section.

19 Claims, 7 Drawing Sheets

(56) References Cited

U.S. PATENT DOCUMENTS

| | | | |
|---|---|---|---|
| 2010/0073769 A1* | 3/2010 | Richards et al. | 359/464 |
| 2010/0316114 A1* | 12/2010 | Fallon et al. | 375/240 |
| 2011/0205494 A1* | 8/2011 | Richards et al. | 353/7 |
| 2012/0300175 A1* | 11/2012 | Richards | 353/7 |

* cited by examiner

PROJECTION SYSTEM AND PROJECTION SYSTEM WITH LIGHT RECYCLING

CROSS-REFERENCE TO RELATED APPLICATIONS

This application claims priority to U.S. Patent Provisional Application No. 61/100,251, filed 25 Sep. 2008, hereby incorporated by reference in its entirety.

BACKGROUND OF THE INVENTION

1. Field of Invention

The present invention relates to light recycling within, for example, projection systems. The invention is more particularly related to light recycling in multi-channel projections systems such as for 3D projections.

2. Discussion of Background

Various methods are in place for 3D stereoscopic projection, including Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

The projectors themselves take on various forms, including LCD (liquid crystal display) projectors which usually contain three separate LCD glass panels, one each primary color component of a image to be projected. The LCD panels modulate the light and produces the image that is projected onto the screen.

DLP ("Digital Light Processing") is a proprietary technology developed by Texas Instruments. The DLP chip is a reflective surface made up of thousands of tiny mirrors. In expensive DLP projectors, there are three separate DLP chips, one for each for the red, green, and blue channels. Typically, a prism separates light from a projection lamp into red, green, and blue colored light which then separately illuminate "red," "green," and "blue" DLP chips which modulate the primary colored lights according to the corresponding primary color components of an image signal. After modulation, the now modulated primary colored lights are recombined and projected onto a viewing screen.

Other, and less expensive, applications of DLP include projectors with a single DLP chip used in conjunction with a color wheel that consists of red, green, blue, and sometimes white (clear) filters. The color wheel spins between a projection lamp and the DLP chip—alternating the color of the light illuminating the chip. The alternating colors of the light illuminating the DLP chip are modulated and projected on a viewing screen in sequence. The sequentially modulated and projected lights then form a full color image when viewed.

The single chip DLP projector described has a lack of efficiency which has been partially addressed through light re-capture and the use of "scrolling color" across the DLP chip. Such techniques are described, for example, in D. Scott Dewald, "*Sequential Color Recapture and Dynamic Filtering: A Method of Scrolling Color*," SID 00 DIGEST, and Dewald, U.S. patent application Ser. No. 10/028,023.

SUMMARY OF THE INVENTION

The present inventors have realized the need to increase brightness and efficiency in the display and/or projection of multi-channel images such as 3D cinema or displays (e.g., theater projections, rear projection televisions, front projectors, medical diagnostic display devices, etc).

In one embodiment, the present invention provides a projection system comprising a light modulator configured to simultaneously modulate at least one portion of a left channel image and at least one portion of a right channel image of a 3D projection. The projection system may further comprise a lighting system configured to illuminate the modulator with two different light bundles comprising a first light bundle comprising a shape consistent with at least part of a shape of the portion(s) of the left channel image modulated by the light modulator, and a second light bundle comprising a shape consistent with at least part of a shape of the portion(s) of the right channel image modulated by the light modulator. In one embodiment, the modulation of the portions of the left channel image and the right channel image occur in instances; and during a first instance of modulation, a first area or areas of the light modulator modulate the portion(s) of the left channel image, and a second area or areas of the light modulator modulate the portion(s) of the right channel image, and, during a second instance of modulation, the first area or areas of the light modulator modulate the portion(s) of the right channel image, and the second area or areas of the light modulator modulate the portion(s) of the left channel image.

The projection system may, for example, include a filter configured to, during the first instance, illuminate the first area or areas of the light modulator with a bundle or bundles of light having properties consistent with the left channel image and illuminate the second area or areas of the light modulator with a bundle or bundles of light having properties consistent with the right channel image, and during the second instance, illuminate the first area or areas of the light modulator with a bundle or bundles of light having properties consistent with the right channel image and illuminate the second area or areas of the light modulator with a bundle or bundles of light having properties consistent with the left channel image. The filter may, for example, comprise a filter wheel in a light path of the projector having a first part configured to produce the bundles of light illuminating the light modulator during the first instance and a second part configured to produce the bundles of light illuminating the light modulator during the second instance.

The filter wheel may be activated or controlled by, for example, a stepper motor configured to drive the filter wheel such that the first part of the filter wheel is aligned in the light path during the first instance and the second part of the filter wheel is aligned in the light path during the second instance.

In another embodiment, the present invention comprises a filter, comprising sections of concentric track shaped filter portions configured for use in left and right channels of a 3D projection system. The concentric filter portions may comprise, for example, spectral separation filters. The spectral separation filters may comprise any number mutually exclusive or complimentary passbands. In one embodiment, the spectral separation filters comprise a first of the spectral separation filters comprises passbands of wavelengths of approximately 400 to 440 nm, 484 to 498 nm, 514 to 528 nm, 567 to 581 nm, and 610 to 623 nm.

The invention may also be embodied as a method, comprising the steps of illuminating a first portion of a light modulator with light having characteristics of a first channel of a 3D image, and illuminating a second portion of the light modulator with light having characteristics of a second channel of a 3D image, wherein the step of illuminating the first portion of the light modulator and the step of illuminating the second portion of the light modulator are performed simultaneously.

The method may include, for example, a step of illuminating comprising spinning concentric track shaped filter portions in a light path of a projector.

The present invention may also be embodied as a projector, comprising a filter wheel comprising at least one set of spectrally separated concentric track shaped filter portions. The projector may further comprise an integrating rod positioned between the filter wheel and a light source, wherein the integrating rod comprises a mirror configured to reflect portions of light not passed by a first of the spectrally separated filters and portions of light not passed by the second set of spectrally separated filters back toward the filters. The projector may be, for example, part of a system including at least one pair of spectrally separated eye filters.

The present invention may also be embodied as, for example, a filter, comprising filter sectors each sector comprising spectral separation filters respectively configured for use in left and right channels of a 3D projection system.

The present invention may also be embodied in a dual projection system, comprising a first projector and a second projector each configured to simultaneously transmit full color portions of first and second channel images and re-cycle portions of spectrum not used by a channel by re-directing the unused portions of spectrum to the other channel. The unused portions of spectrum may be re-cycled, for example, by directing them to the other channel in the same projector. The portions of spectrum may be re-directed, for example, by reflection from a filter having characteristics of the channel from which the spectrum is being re-directed. The filter may be, for example, a filter wheel having filter sections wherein at least one filter section comprises characteristics of the first channel and at least one filter section comprises characteristics of the second channel.

In other embodiments, the present invention provides a filter (e.g., a filter wheel) comprising spirally shaped filters configured for use in left and right channels of a 3D projection system. The spirally shaped filters are, for example, rotated so that the portions of filtered light from each spiral "scroll" across modulators (e.g., DLP modulators). In one embodiment, at least one of the spectral separation filters comprises three passbands of visible light, a first passband configured to pass only a first color of light, a second passband configured to pass two spectrum adjacent colors of light comprising the first color of light and a second color of light, and a third passband configured to pass two spectrum adjacent colors of light comprising the second color of light and a third color of light. In one embodiment, at least one of the passbands passing spectrum adjacent colors of light includes a notch band that separates the spectrum adjacent colors and is not passed by the passband.

In one embodiment, channel illumination is provided by a multi-sectored filter wheel having at least one filter portion for a first channel and at least one filter portion for a second channel (e.g., portions of a track shaped filter), where boundaries between the portions are different in each sector.

Portions of both the devices and methods of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10B-1 and 10B-2 are diagrams of a filter wheel and two positions of the filter wheel according to an embodiment of the present invention;

DESCRIPTION OF THE PREFERRED EMBODIMENTS

Figure 1:
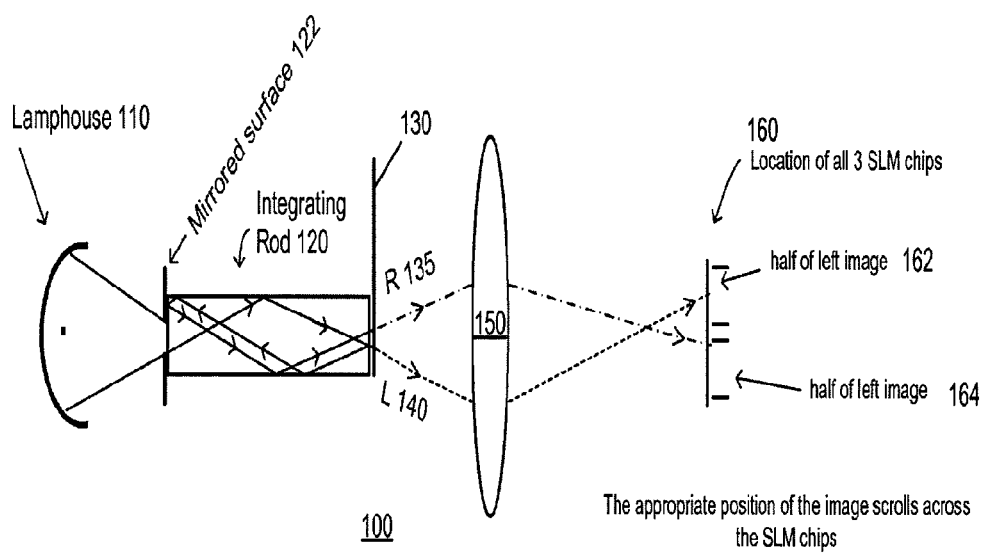
FIG. 1 is an optical schematic according to an embodiment of the present invention.

Referring now to the drawings, wherein like reference numerals designate identical or corresponding parts, and more particularly to FIG. 1 thereof, there is illustrated an optical schematic 100 according to an embodiment of the present invention. The schematic shows a light path from a lamphouse 110 to modulation chips 160 (e.g., 3 Spatial Light Modulator (SLM) Chips), which are, for example, TI DLP's, LCoS, or other modulators. An integrating rod 120 homogenizes light received from the lamphouse 110. A filter 130 (e.g., filter wheel) filters light exiting the integrating rod 120 into a light bundle with separate channels which are, for example, left and right channels of a 3D projection system. Optics 150 direct the filtered light so as to illuminate modulation surfaces of the modulation chips 160.

The filter 130 is located very close to the output of the integrating rod such that light reflected from the wheel re-enters the rod, and such that the wheel is located at an image point for the modulation chips (e.g., DMD/DLP, LCoS, LCD, etc). The integrating rod includes, for example, a reflective surface 122 (e.g., a mirrored surface), which acts to redirect light that either fails to exit the integrating rod or is reflected into the rod from either the filter 130, the modulation chips 160, or any other portion of the light path.

The filter 130, is, for example, a spinning wheel filter that includes filters that pass the left and right channels of a 3D projection system. Light exiting the filter 130 includes, for example, a partial light bundle including beam 135 destined for modulation as part of the right channel and partial light bundle including beam 140 destined for modulation as part of the left channel. As shown, each of the light beams 135 and 140 illuminate different sections of the modulators corresponding to portions of the right and left images, respectively (e.g., ½ left image and ½ right image).

Figure 2:
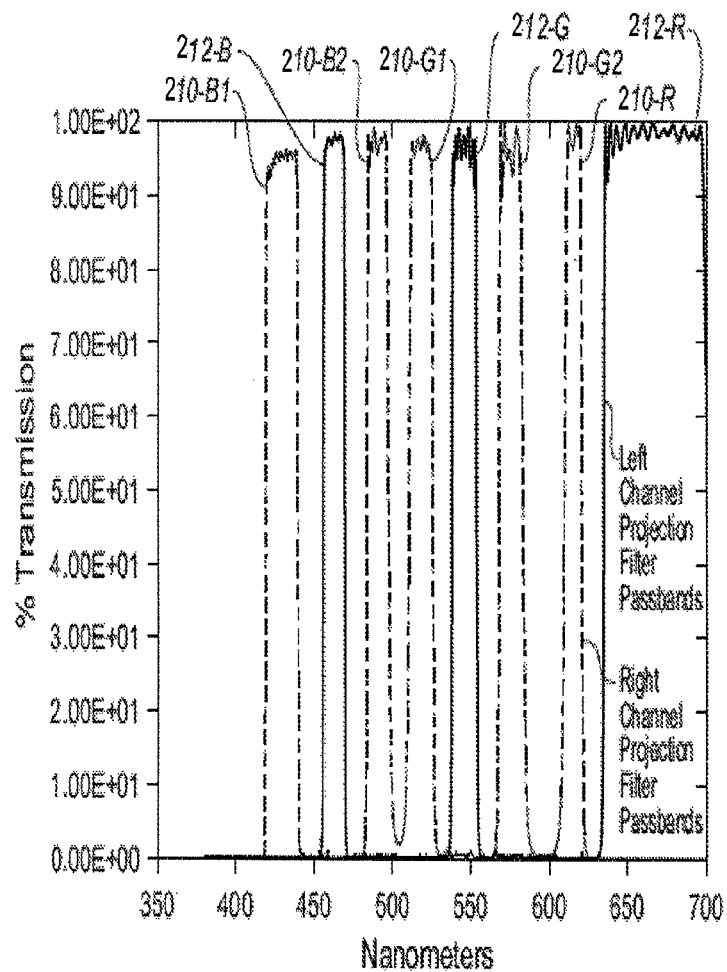
FIG. 2 is a set of exemplary band passes utilized to filter left and right channels according to an embodiment of the present invention.

FIG. 2 is a set of exemplary band passes utilized to filter left and right channels according to an embodiment of the present invention. As shown in FIG. 2, a right channel projection filter has passband wavelengths of blue at 400 to 440 (210-B1) and 484 to 498 nm (210-B2), green at 514 to 528 (210-G1) and 567 to 581 nm (210-G2), and red at 610 to 623 nm (210-R). A left channel projection filter has passband wavelengths of blue at 455 to 471 nm (212-B), green at 539 to 556 nm (212-G), and red at 634 to 700 nm (212-R). Of course other permutations exist, such, as, for example, switching the left and right channel wavelengths, or switching the green and blue wavelengths etc. In addition, the passband wavelengths are approximate and each band may vary by, for example +/−5 nm or more. Such variations may occur by shifting the entire passband and/or by selecting one or more different endpoints for the passbands. An important consideration is that such variances should not reduce the guard band between passbands to a level where a system using the filters incurs unacceptable levels of crosstalk between the channels. In sum, the filters include, for example, at least one band in each of red, green, and blue lights for each of the channels. The filters may include more than one band in a same color and same channel. The filters may also include guard bands between adjacent portions of spectrum in different channels. The filters may also include a notch band between adjacent colors in the same channel. A full discussion of similar channel filters in the context of 3D projection systems is provided by Richards et al., U.S. patent application Ser. No. ##/###, ### [(not yet assigned)], and Richards et al., U.S. Provisional Patent Application Ser. No. 60/931,320, the contents of each of which are incorporated herein by reference in their entirety.

In designs such as those represented in the above noted patent applications [patents] using a 3D spectral separation filter wheel, the filter wheel is, for example, divided into 2 halves, each half comprising a channel filter. In embodiments of the present invention utilizing a filter wheel, the filter wheel is instead divided into spiral sections (filter 130 is, for example, a multi-segment spiral spectral separation wheel), or sections of other geometric properties (e.g., radial filter sections). The filter 130 is, for example, located at the output of the integrating rod of the projector.

Figure 3A:
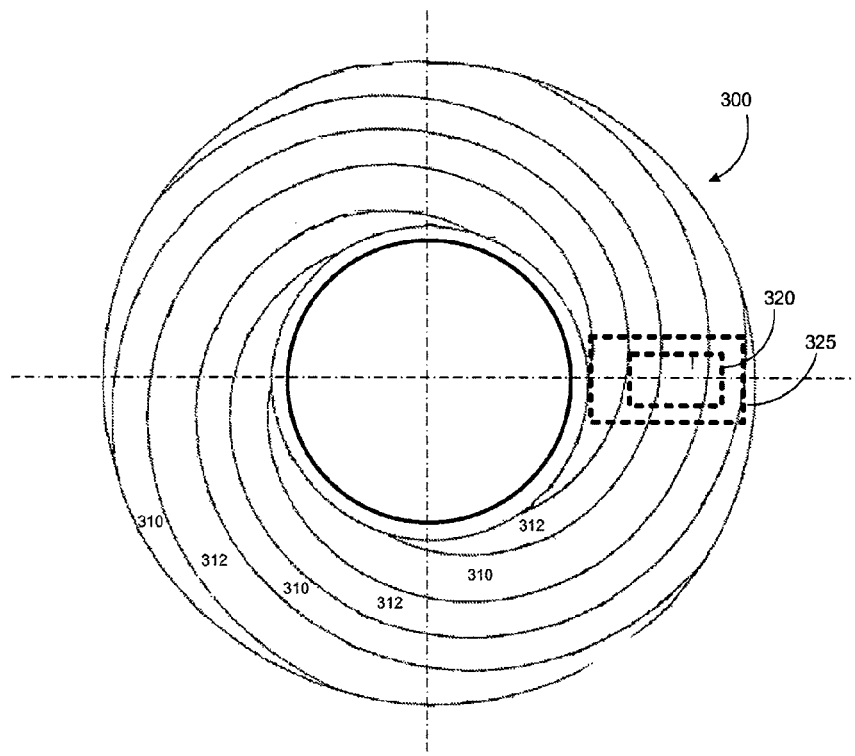
FIG. 3A is a drawing of a multi-segmented spiral spectral separation filer wheel according to an embodiment of the present invention.

FIG. 3A is a drawing of a multi-segmented spiral spectral separation filer wheel 300 according to an embodiment of the present invention. The wheel 300 includes sections 310 (e.g., a right channel filter) having a spectral separation filter (e.g., passbands consistent with, for example, Right Channel Projection Filter Passbands 210-B1, 210-B2, 210-G1, 210-G2, and 210R), and section 312 (e.g., a left channel filter) having a second spectral separation filter (e.g., passbands consistent with, for example, Left Channel Projection Filter Passbands 212-B, 212-G, and 212-R).

FIG. 3A also illustrates an outline of possible sizes and a location of a 16×9 integrating rod output (320 and 325) on the filter wheel 300. Light output from the integrating rod passes through multiple segments of the filter 300 and then illuminates the modulation chips (e.g., the modulation surfaces of the modulation chips) with the multiple segment filtered light. The modulation chip then modulates, in sections, the left and right channel images simultaneously. The sections corresponding to the left and right channel segments of filtered light illuminating the modulation chips.

Because of a rotational speed of the filter, the illuminated sections "scroll" across the modulation chips, and modulation data energizing each pixel of the modulation chip is provided based on the frame rate of the video image being projected and whether the pixel is in a section illuminated by a left or right channel segment of filtered light (taking into account the scroll rate and filtered light bundle shape/dimensions, and hence the changing locations of left and right filtered sections scrolling across the modulating chips).

Figure 3B:
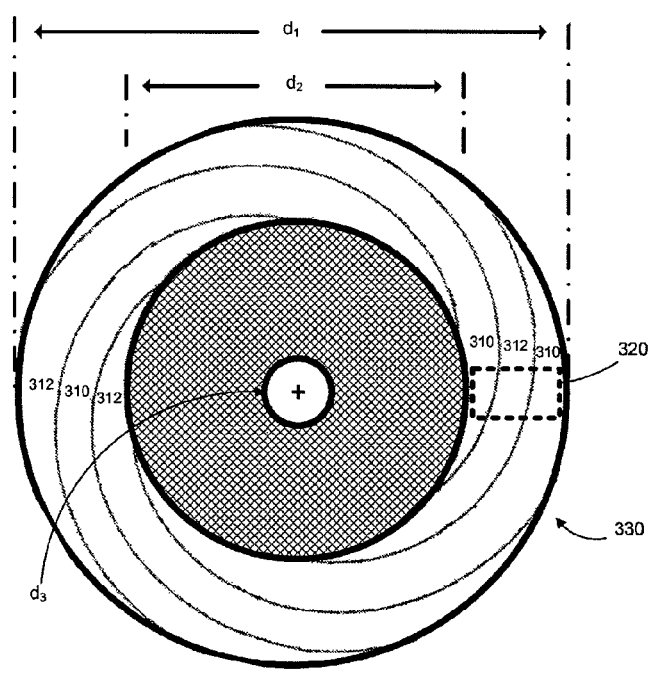
FIG. 3B illustrates variable diameter dimensions of a filter according to an embodiment of the present invention.

FIG. 3B illustrates variable diameter dimensions of a filter according to an embodiment of the present invention. A more efficiently produced filter utilizes less of the comparatively more expensive filter materials. A smaller dimension $d_1$ means a smaller filter overall and generally less filter material. Dimension $d_2$-$d_3$ provides a non-filter filler material that accounts for space between a perimeter of an attachment point of a rotating mechanism of a projector and an approximate beginning of the integrating rod output. The integrating rod output and filter material encompassing an area of approximately $d_1$-$d_2$. The diameter $d_3$ matching the rotating attachment point (and, depending on the projector design, matches the shape and characteristics of the attachment point for the projector). A filter wheel according to the present invention may be retro-fitted to existing projector designs by matching the attachment point and varying the amount of filter material (diameters $d_1$ and $d_2$) to cover the integrating rod output (or other light bundle within the optical path at the rotating mechanism).

Figure 3C:
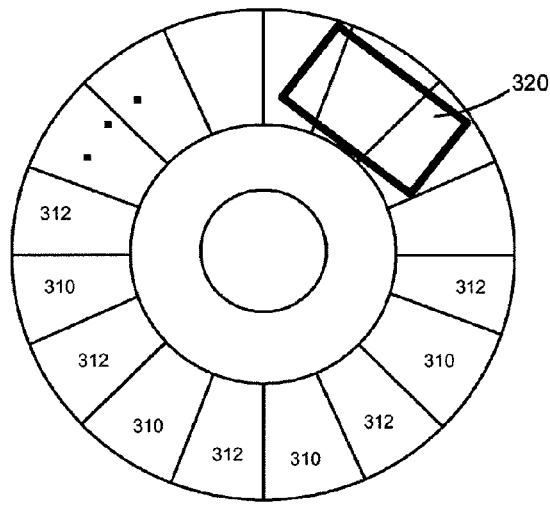
FIG. 3C illustrates a radially designed filter wheel according to an embodiment of the present invention.

FIG. 3C illustrates a radially designed filter wheel according to an embodiment of the present invention. As shown in FIG. 3C, the alternating filter sections 310 and 312 (corresponding to filters for right and left channels respectively) extend radially from a center of the filter wheel. The integrating rod output 320 is shown as being covered by approximately 2 filter sections (one full section, and one scrolling in section and one scrolling out section). However, the filter sections may be variable size with any number of sections (2 or more) being over the output at any given time. Other shapes for the filter sections may also be utilized along with corresponding changes in modulation data matching the channel of the filtered light that "scrolls" across the modulation surfaces.

In one embodiment, the filter sections 310 and 312 may be constructed, for example, so as to transmit the passbands (e.g., passbands noted in FIG. 2) and block non-pass bands, with very little of the light being absorbed. For example, greater than 90% of the passbands for either the right channel or the left channel, and preferably greater than 95% of the passbands, are transmitted, while reflecting greater than 90% of the blocked, non-pass bands (and preferably reflecting greater than 95% of the non-pass bands). The filters may be created, for example, by a physical vapor deposition process using metal oxides creating dichroic filters of the appropriate characteristics.

Figure 4:
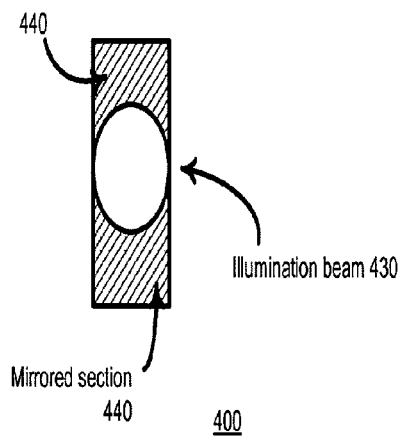
FIG. 4 is a drawing of an input end of an integrating rod according to an embodiment of the present invention.

FIG. 4 is a drawing of an input end of an integrating rod 400 according to an embodiment of the present invention. The integrating rod 400 includes a mirrored section 440 which reflects light. An illumination beam 430 is input light from, for example, lamphouse 110. In one embodiment, the mirrored section is a mirror at the input end of the light rod that re-reflects light that has been reflected upstream toward the input end of the integrating rod. The re-reflection directs the reflected light back towards the output end of the integrating rod (and further downstream toward the filter and modulator(s)). In another embodiment, the mirrored section also intercepts light from a light source (e.g., lamphouse 110) incident on the upstream side of the mirrored section which may then be reflected back into the lamphouse. Such reflections are intended to increase the efficiency of the light path.

Figure 5:
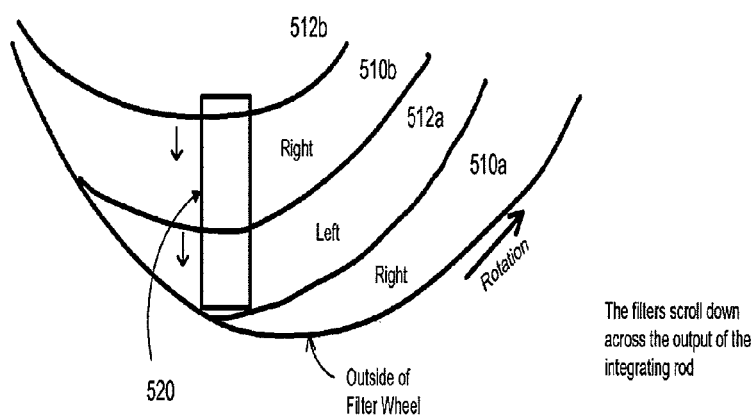
FIG. 5 is an illustration of left and right channel filtering according to an embodiment of the present invention.

FIG. 5 is an illustration of left and right channel filtering according to an embodiment of the present invention. A filter wheel 500 is illustrated as rotating in a counter-clockwise direction. Alternating sections of right channel filter (e.g., filter sections 510a, 510b, etc) and left channel filter (e.g., 512a, 512b, etc.) scroll across an integrating rod output 520, resulting in a light bundle whose cross-section includes segments of light which scroll over time (and include both left channel filtered light and right channel filtered light). The segmented light bundle then illuminates one or more modulation chips which modulate the segmented light bundle.

In the illustrated embodiment, both the left channel filter and right channel filter are present in the light path simultaneously, and the wheel rotates during the frame period. And, approximately ½ of the image of the wheel is left and ½ is right. The modulating chip formatting is modified such that a portion of the left image being modulated "scrolls" across the pixels of modulating surface. Modulation data for the left image corresponding to pixels of the modulating surface being illuminated with left channel filtered light energize the illuminated pixels. A similar process occurs for the right image and the right channel filtered light.

At least some of the light that is reflected from the left section of the color wheel that re-enters the integrating rod is reflected from the mirrors at the input of the integrating rod, and some of this reflected light passes through the right portion of the filter wheel, thus increasing the light that passes through the right channel over a non-reflecting configuration. At least some of the light that is reflected from the right section of the color wheel that re-enters the integrating rod is also reflected from the mirrors at the input of the integrating rod, and some of this reflected light passes through the left portion of the filter wheel, increasing the light that passes through the left channel over the non-reflecting configuration. Overall, these reflections ("light recycling") increases the light efficiency of the projection system.

Although FIG. 5 illustrates as having 3 active sections, a scrolling in section (e.g., 512b), a scrolling section (e.g., 510b), and a scrolling out section (e.g., 512a). In fact, any number of sections may be utilized by varying the width of the spirals (e.g., separate embodiments having 2, 3, 4, 5, 6, 7, or more sections of alternating or changing filter material specifications). Further, the spirals may be sized such that the integrating rod output is covered by 2 or more scrolling sections plus scrolling in and scrolling out sections. In one embodiment, the spiral widths are the same or approximately the same. In another embodiment, the spiral widths vary, and if implemented with varying widths, corresponding varying modulation data would also be provided to the illuminated light modulators.

In one embodiment, differences in illumination intensity between channels is compensated for by adjusting filter sizes. For example, if the intensity of light available for the left channel is lower than the intensity of light available for the right channel, the filter size of the left filter is increased until a better match is reached. Corresponding changes in programming for energizing the modulation chips is also provided (e.g., scrolling a larger portion of the left channel across the modulation surface in synchronization with the larger filter section passing through the light path).

As shown in FIG. 3A, the filter may accommodate various sizes of integrating rod outputs. The integrating rod output (e.g., 320/325) may, for example, be the entire end of the integrating rod or an output aperture. For better efficiency, the integrating rod output is, for example, shaped proportional to a size of the modulation surface of the modulation chips and a final image projected from the projection system.

In the illustrated embodiments, both left and right channel portions contain at least all three primary colors, and, using the exemplary filters, at least one channel includes more than one wavelength band in a same color (e.g., the right channel includes more than one band of blue light). However, other arrangements can be made based on the principles of the present invention including sequential red, green, and blue (or other primary and/or mixed color) images each containing both left and right channel wavebands simultaneously.

Figure 6:
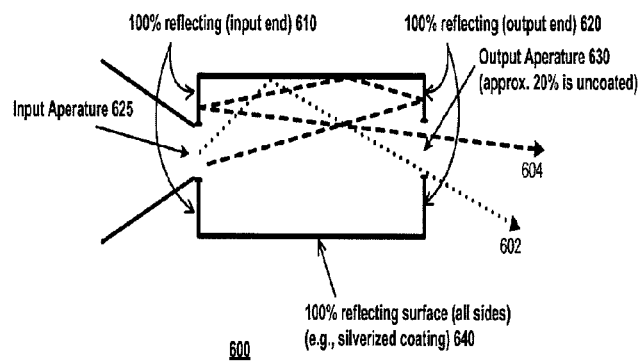
FIG. 6 is a drawing of an alternate integrating rod according to an embodiment of the present invention.

FIG. 6 is a drawing of an alternate integrating rod 600 according to an embodiment of the present invention. Mirrors are located at the portions of the input to the integrating rod that are not illuminated by the lamphouse. An input end of the integrating rod 600 includes a reflecting surface 610 (e.g., 100% reflecting surface) and an input aperture 625. The input end reflecting surface 610 may be configured as described above with reference to FIG. 4.

The integrating rod 600 also includes an output end reflecting surface 620 (e.g., 100% reflecting) and an output aperture 630. The output aperture is constructed by, for example, not coating the aperture with any reflecting material. The integrating rod body may be coated, for example, with a silverized or other material assuring near or equal to 100% internal reflection and little or no loss within the integrating rod.

The input aperture 625 allows light to enter the integrating rod. Two potential light paths are illustrated, a first path 602 reflecting off an interior of the integrating rod body and exiting the output aperture 630. The second path 604 reflects off the output end reflecting surface 620 and then internally reflects off the integrating rod body and the input end reflecting surface 610 and then on to a path that exits the output aperture. Any number or combination of reflections off the integrating rod body and/or the output end reflecting surface and/or the input end reflecting surface can occur prior to a light beam exiting the output aperture.

Figure 7:
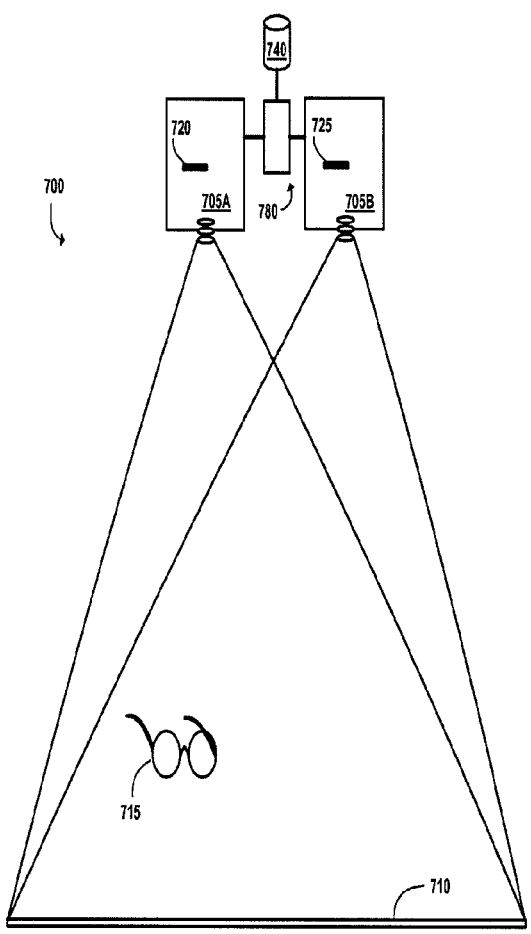
FIG. 7 is a drawing of a dual projector system according to an embodiment of the present invention.

FIG. 7 is a drawing of a dual projector system 700 according to an embodiment of the present invention. Left and right channel images are derived, decoded, retrieved, or reconstructed from data stored on disk drive 740 (or received from an appropriate network or transmission reception) by server 780. Color correction as described in the above noted patent applications may also be applied. The color correction, if utilized, is performed, for example, on a channel-by-channel basis and applied to the energizing data of the modulation chip in accordance with which pixels are illuminated by filtered light of the corresponding channel (e.g., pixels illuminated by left channel light have left channel color correction data applied).

The decoded, color corrected (if applicable), left and right channel images are then projected simultaneously and in part from a first projector 705A and a second projector 705B onto screen 710 for viewing through glasses 715. A projection filter 720 in the first projector has at least two passbands as described in any of the above embodiments. A projection filter 725 in the second projector has at least two passbands as described in any of the above embodiments. The light source of each projector is filtered by its projection filter and then illuminates modulators within the projector.

The illumination onto each modulator in both projectors comprises light with wavelengths from both a left and a right channel. The light filters (and modulators) of both projectors may be synchronized such that both projectors project identical images. However, in one embodiment, both the modulation chip energizing data and the filtered light illuminating pixels at a same corresponding locations in the separate projectors are inversely synchronized.

In a 3D left and right channel system, once the images from both projectors are combined, such inverse synchronization results in the production of full left and right images at any particular instance in time. Conversely, when the projected images are combined without inverse synchronization at a particular instance of time, only part of the image is present for each eye.

By way of further example, in inverse synchronization, half of the modulation surface of each modulator in one projector may be illuminated with left channel filtered light and pixels illuminated by the left channel filtered light are energized with modulation data for a left channel image. The other half of the modulation surface of each modulator is illuminated with right channel filtered light and the pixels so illuminated are energized with right channel image data. The modulators of the other projector are then inversely illuminated and energized. In result, if the 50% of the modulator being used for the left channel in one projector is the "top" half of the modulation surfaces, then the other projector utilizes the "bottom" half of its modulation surfaces for the left channel. The same relationship exists between channels when the modulation surfaces are broken down into more parts, where, for example, 2 or more sections of "scrolling" left channel filtered light illuminate 2 or more "scrolling" sections of a modulation surface and are side-by-side to 1 or more sections of "scrolling" right channel filtered light (sections of the modulators in one projector being illuminated and energized according to a left channel are illuminated and energized according to a right channel in the other projector).

Regardless of the percentage of modulation surface being used by a particular channel, in an inverse synchronization arrangement, it is the sum of the images from both projectors that creates the full images for each channel (a workable system results when, for example, 25% of the modulation surfaces of one projector are used by the left channel—the other projector utilizes 75% of its modulation surfaces modulate the remainder of the left channel image). The inverse synchronization may be accomplished, for example, by different relative positions of the filters in each projector and providing appropriate modulation data to each modulator.

Inverse synchronization significantly reduces flicker and allows the use of "double flash" using dual active projection. The "double flash" concept is inverse synchronization in a dual-projector stereoscopic 3D projection system, where both projectors alternate between the left and right channel images, but in such a way that all (or most) of the time, the two projectors are each individually projecting a full image from opposite channels. For example, in one instance, a first projector projects a complete left channel image and a second projector projects a complete right channel image. In a next instance, the first projector projects a complete right channel image and the second projector projects a complete left channel image. A color or polarization filter of each projector also alternates in full to match the polarization of the channel being projected by the projector.

Glasses 715 include left and right channel viewing filters respectively disposed on left and right lenses of the glasses. The viewing filters are, for example, passbands that encompass each passband of a corresponding channel in the projection filters.

Figure 8:
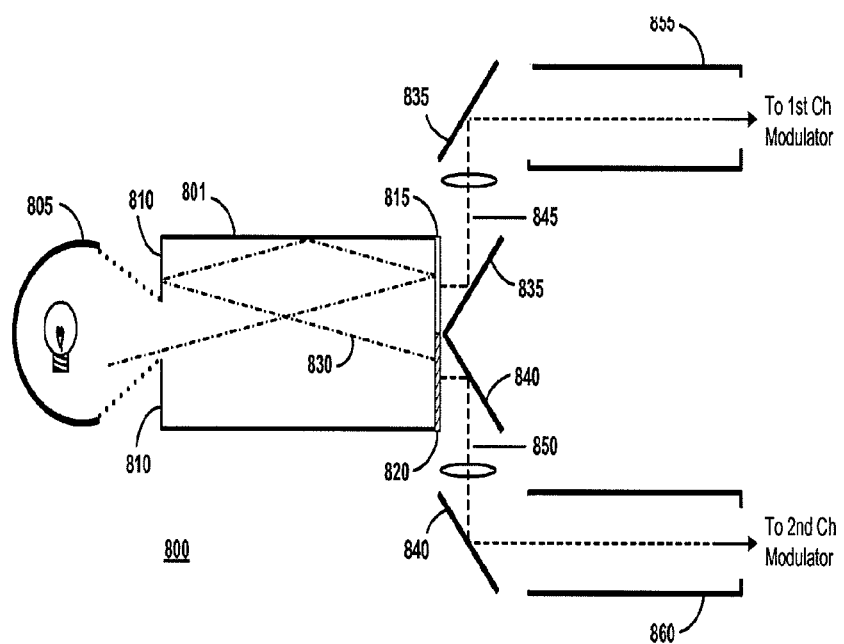
FIG. 8 is a drawing of non-rotating light re-cycling system according to an embodiment of the present invention.

FIG. 8 is a drawing of non-rotating light re-cycling system 800 according to an embodiment of the present invention. An integrating rod 801 is illuminated by a light source (e.g., lamphouse) 805. An input aperture is surrounded by mirror 810. A first channel filter 815 and a second channel filter 820 are positioned at an output (e.g., an output aperture) of the integrating rod. Reflections from either the first channel filter 815 or the second channel filter 820 are "recycled" by further reflection off mirror 810 and/or the sides of the integrating rod.

The reflected light has the opportunity to pass through the channel filter opposite the channel filter that reflected it back towards mirror 810 (e.g., light beam 830 was initially reflected toward mirror 810 by the first channel filter 815 and was reflected multiple times within the integrating rod, including off mirror 810, and then exited the integrating rod through the second channel filter 820). Light that fails to strike a passable channel filter is reflected again providing yet another opportunity to pass the/an appropriate channel filter.

Light passed by the first channel filter 815 then follows a path (e.g., reflection via mirrors 835 through $2^{nd}$ integrating rod 855) to modulators for the first channel. Light passed by the second channel filter 820 follows a path (e.g., reflection via mirrors 840, through $3^{rd}$ integrating rod 860) to modulators for the second channel. The modulators are for example, 3 chip DLPs. The modulators, for example, respectively modulate left and right images of a 3D image.

In a single projector system utilizing the non-rotating light re-cycling system, the left and right modulated images are recombined and then projected through a projection lens onto a screen for viewing. For example, ½ of the modulation chip is used for modulating the left channel image and the other ½ of the modulator is used to modulate the right channel image. Optics similar to those used in "dual strip" film projectors are then utilized to combine the left and right channel light paths into a single 3-D light path.

As with other embodiments described herein, the projection onto the screen is, for example, either a rear or front projection configuration. Alternatively, separate projection lenses may be configured for the left and right channels individually. A dual projection system utilizing the non-rotating light re-cycling system would utilize two projectors respectively projecting left and right channel images simultaneously onto the same screen for increased brightness.

Figure 9A:
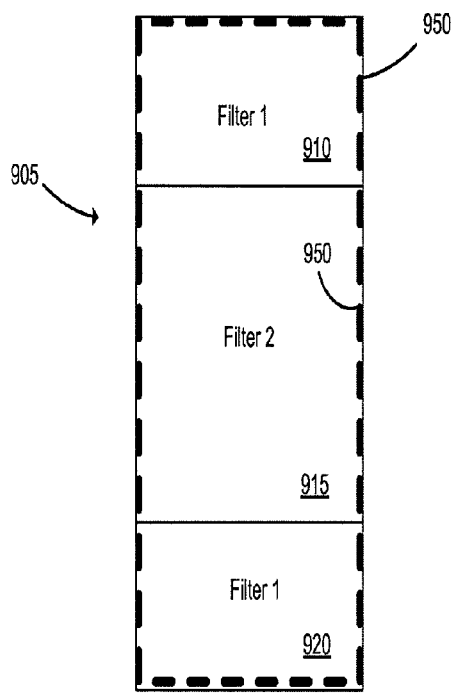
FIGS. 9A and 9B are diagrams illustrating patterns of light used to illuminate modulation surfaces according to an embodiment of the present invention.

In one embodiment, the present invention provides for light recycling that does not utilize scrolling of light across the modulation surfaces of the projector electronics or scrolling of energization data of the modulator(s). As shown in FIG. 9A, a modulation surface (or modulation surfaces) (illustrated as dotted-line 950) of a light modulator (e.g., a TI DLP chip) is illuminated with a pattern of light 905 comprising portions of two different channels of light. Although shown as a specific pattern for two channels of light, the invention is not limited to any particular shape or number of channels. The light channels comprise, for example, a left channel comprising light 910/920 transmitted through a first filter material (e.g., filter 1) or first light source, and a right channel comprising light 915/925 transmitted through from a second filter material (e.g., filter 2) or second light source. The light channels comprise, for example, light channels of a 3D imaging system.

While being illuminated by the pattern of light 905, the modulation surface of the light modulator modulates according to both the left and right channels of a 3D image to be projected by the 3D imaging system. In this example, a first quarter of the modulation surface(s) modulates a first quarter of a left channel of the 3D image; a second and third quarter of the modulation surface(s) modulates second and third quarters of a right channel of the 3D image; and a fourth quarter of the modulation surface(s) modulates a fourth quarter of the left channel.

Figure 9B:
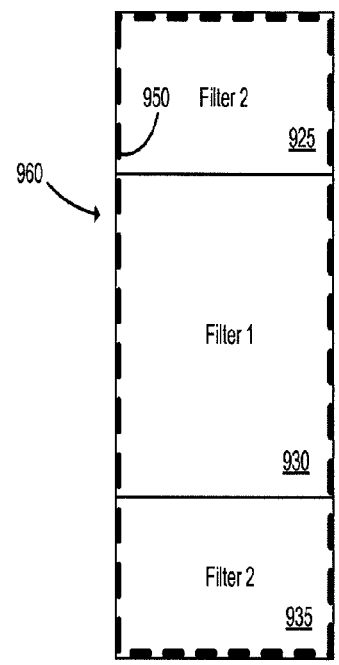

The light pattern and modulation according to FIG. 9A occurs in a first instance of projection of the 3D image. In a second instance, the pattern of light changes to the pattern 960 illustrated in FIG. 9B. As shown in FIG. 9B, the modulation surface (or modulation surfaces) 950 of the light modulator is illuminated with a pattern of light 960 which is inverted in comparison to the pattern of light 905.

While being illuminated by the pattern of light 960, the modulation surface of the light modulator modulates according to both the left and right channels of the 3D image to be projected. In this instance however, a first quarter of the modulation surface(s) modulates the first quarter of the right channel of the 3D image; the second and third quarters of the modulation surface(s) modulates second and third quarters of the left channel of the 3D image; and the fourth quarter of the modulation surface(s) modulate the fourth quarter of the right channel. In sum, the modulations of FIGS. 9A and 9B provide a modulation of each quarter of both channels that, when viewed on a display surface (e.g., theater screen, television screen, etc), combine to produce a full 3D image.

In one embodiment, including the embodiment illustrated in FIG. 9, approximately equal portions of the modulation surface(s) are illuminated by light filtered (or transmitted through a filter) according to channel 1 (or filter 1, e.g., the left channel) and light filtered according to channel 2 (or filter 2, e.g., the right channel). However, other percentages or divisions of the filtered light may be utilized. For example, one embodiment may hold that more than 50% of the modulation surface is illuminated by one channel in the first instance, and then more than 50% of the modulation surface is illuminated by the other channel in the second instance. In yet other alternatives, the division of areas can be in more parts. For example, 2 areas of illumination for one channel may be bounded by 3 areas for the other channel. Based on the present disclosure, any number of alternatives can be made based upon the teachings described herein, and the present invention is specifically intended to cover any such alternatives which are too numerous to be practical to list entirely herein.

The filtering, and more particularly the switching of filters utilized to cause patterns of light (e.g., patterns of light 905 and 960) to switch in synchronicity with instances of modulation as described above, may be performed, for example, via a filter wheel or via an electronically switched filter. The instances comprise, for example, a flash or group of flashes of a projection format.

The flashes of a projection format are generally utilized to reduce the perceptibility of flicker. Double (2×) or triple (3×) flash techniques are often used. In the double flash case, the image from each eye is projected twice during the frame. For example, the left eye image is projected for the first quarter of the frame, then the right eye image is projected for the second quarter of the frame, then the left eye image is projected again for the third quarter of the frame, and finally the right eye image is projected again for the last quarter of the frame. While each eye still receives alternating light and dark sections, the maximum duration of any dark section is cut in half, which reduces flicker artifacts.

Triple (3×) flash operates similarly, but instead of twice per frame, the image for each eye is projected three times per frame. This reduces even further the maximum duration of any dark section. While higher-order flashing is possible, triple flash is typically sufficient to make flickering imperceptible in most cases.

Here, a first group of one or more flashes (e.g., one flash in a single flash projector, 2 flashes in a double flash projector) occur in one instance when one of the filters is producing a pattern of light for first portions of each channel of a projected image, and, in another instance a second group of flashes occur in a second instance when a second filter is producing a second, inverse, pattern of light for second portions of each channel (e.g., the patterns of light 905 and 960 are inverted in that channel 1 light in 905 (910/920) is replaced by channel 2 light in 960 (925/935) and visa versa.

Thus, patterns of light 905 and 960 alternately illuminate the modulation surface(s). The patterns of light do not correspond precisely to either of the left or right eye image, but are combinations of the two. The filters that produce the patterns of light can be implemented by triple dichroic filters used in the current Dolby 3D system or polarization filters, linear or circularly polarized filters as in other systems. The projectors can be D-cinema 3 chip DLP, 1 chip DLP projectors, or devices based on other technologies (e.g., LCoS projectors).

A Frame Composite 1, is then composed for energizing the modulation surface 950 illuminated by the pattern of light 905. The Frame Composite 1 is composed in, for example, an Image Media Block of a Server used by the projection system, which has simultaneous access to both the left and right image of a stereoscopic movie. The resulting Frame Composite 1 may then be directed to the projector's first input (which traditionally receives the left eye image). Similarly, a Frame Composite 2 for energizing the modulation surface(s) illuminated by pattern of light 960 is also composed in the Image Media Block and may be directed to the second projector input (which traditionally receives the right eye image). The projector then directs, or energizes, the modulation surfaces (e.g., DMD chips), which causes them to function as if it were seeing a stereoscopic image and 'generates' the image by appropriately flipping the thousands of mirrors of the chips with either Frame Composite 1 in time with pattern of light 905 or Frame Composite 2 in time with pattern of light 960.

During a flash of the projector, the filtered light (or light source) and the mirrors are in both time and spatial synchronicity. The result is a composite image on the screen so that at any given instant in time there will be a partial left eye image and a partial right eye image. The projector, if it is a TI DLP projector, is capable of interspersing the two images, in this case Frame Composite 1 and Frame Composite 2 from single flash, 2× flash or 3× flash modes.

In one embodiment, a mechanical assembly steps between the two filters or light sources (e.g., a filter producing pattern of light 605 and a filter producing pattern of light 640). For a 2 projector system this can be as slow as the frame frequency or even slower and can be accomplished using a simple mechanical mechanism. In a single projector system alternation between the two images, Frame Composite 1 and Frame Composite 2, matches the native switching rate of the projector (this is also useful for a two projector system). If the projector is set at 2× (or 3×) flash mode where it alternates internally between the left and right images 4 (6)× per frame, then for 24 frames per second frame rate, the two images alternate every 10.4 (6.9) millisecs.

Figure 10A:
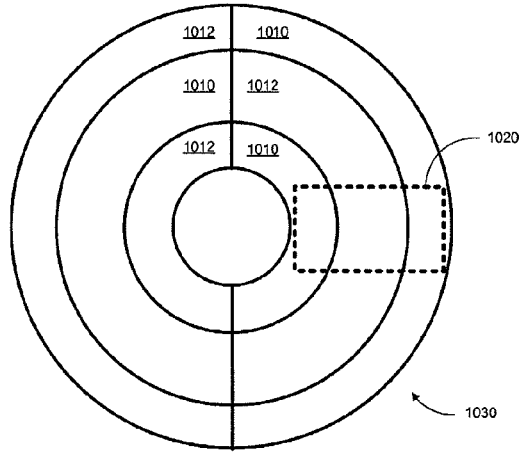
FIG. 10A is a diagram of a filter wheel according to an embodiment of the present invention.
Figures 1, 10B:
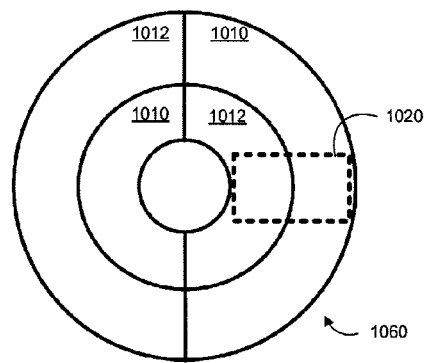
Figures 2, 10B:
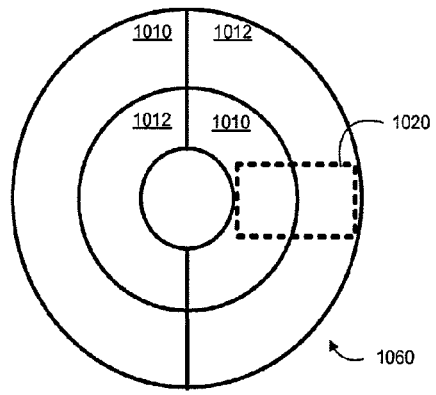

One method of accomplishing alternation of the patterns of light is to use one of the filter wheels shown in either FIG. 10A or 10B. In FIG. 10A, a filter wheel 1030 is illustrated comprising 6 filter sections, 3 on each side of the wheel. The filter sections comprise a first filter material 1010 corresponding to a first channel in a multi-channel projection system (e.g., a left eye channel of a 3D projection), and a second filter material 1012 corresponding to a second channel in the multi-channel projection system (e.g., a right eye channel of the 3D projection). On a first side of the wheel 1030, the filter materials are arranged by quarter, a 1st quarter corresponding to filter material 1010, 2nd and 3rd quarters corresponding to filter material 1012, and a 4th quarter corresponding to filter material 1010. On the second side of the wheel the filter sections are inverted compared to the first side of the wheel, comprising a 1st quarter corresponding to filter material 1012, 2nd and 3rd quarters corresponding to filter material 1010, and a fourth quarter corresponding to filter material 1012.

A modulation surface 1020 to be illuminated by the pattern of light transmitted through from the filter wheel is also illustrated. The modulation surface is alternately illuminated, first by a pattern of light transmitted through the first side of the wheel (as illustrated) and second by a pattern of light transmitted through the other side of the wheel (e.g., at a position 180 degrees from that illustrated). The rate of alternation may match, for example, the projector system's alternation between the two images (Frame Composite 1 and Frame Composite 2). The alternation may occur by placing the wheel in a light path of the projector (e.g. just after or just before an integrating rod of the projector) and rotating the wheel back and forth 180 degrees. The same might also be accomplished by spinning the wheel at appropriate rates to achieve a similar effect.

FIG. 10B-1 is a diagram of a filter wheel 1060 according to an embodiment of the present invention in a first operational position. The filter wheel 1060 is divided into halves each half comprising two filter sections comprising a first channel (e.g., filter material 1010) and a second channel (e.g., filter material 1012). The filter wheel 1060 may also be described as being divided into concentric track shaped filter portions. Approximately one half of a modulation surface 1020 is illuminated by light transmitted through channel 1 filter material 1010 and another approximately one half of the modulation surface is illuminated by light transmitted through channel 2 filter material 1012. In embodiments using the illustrated filter wheel 1060, the modulation surface 1020 is energized with approximately one half its surface, where light is transmitted through filter material 1010, with image data for channel 1 and the other approximately one-half of the modulation surface is energized with image data from channel 2.

FIG. 10B-2 illustrates the filter wheel 1060 in a second operational position. Again, approximately one half of a modulation surface 1020 is illuminated by light transmitted through channel 1 filter material 1010 and another approximately one half of the modulation surface is illuminated by light transmitted through channel 2 filter material 1012. However, the areas illuminated due to light transmitted through the filter materials is reversed (or inverted) compared to the first operational position, that is the areas previously illuminated by light transmitted through filter material 1010 are now illuminated by light transmitted through filter material 1012 and visa versa. The first operational position and the second operational position are set by one of a rotation or stepping action of the filter wheel (The filter wheel may be moved, for example, by a stepper motor that switches the filter between the first operational position and the second operational position).

The filter materials 1010 and 1012, may comprise, for example, passbands and notch bands as in any of the embodiments described further above (e.g., passbands and notch bands as shown, for example, in FIG. 2).

Precision and separation between the different areas of light projected onto the light modulators (e.g., light passed by filter material 1010 vs. light passed by filter material 1012), may cause artifacts .(e.g., distortion, crosstalk) in that some portions of left eye channel pixels on the modulator may be illuminated with all or a portion of light intended for the right eye channel. In one embodiment, to minimize such artifacts, the image being modulated is smoothed in the area of transition. The smoothing may be performed by, for example, moving the boundary in the server, one vertical line per frame (e.g., +5 frames). Parameters of an algorithm for moving the boundary line in the server can be further optimized after the projector and filter wheel is installed to find the best location for the midpoint of the boundary in the server. Such an optimization would be performed, for example, at the same time as the wheel is installed and synchronized in the projector.

In another embodiment, the modulation data for pixel at or near a boundary between light of two different channels may be adjusted. For example, in one embodiment, pixels at the boundary may be an average of the left and right channel images. In another embodiment, pixels on either side of the boundary can be weighted. In yet another embodiment, pixels at each boundary are modulated at an average of the modulations for the left and right images on each side of the boundaries, and a set of N lines (e.g., +/−5 lines) on each side of each boundary are weighted based on distance from the boundary (each line closer to the boundary is progressively weighted more towards the modulation of the image on the other side of the boundary.

The artifacts may also be minimized by identifying the color content and intensity for each neighboring pixel on each side of the border. When the colors and intensities match within certain limits then the colors and intensities can be smoothed across two or more pixels to blur the transition. When there is an abrupt change in color intensity across the boundary then blacking out near-by pixels may give the best overall performance.

Figure 11:
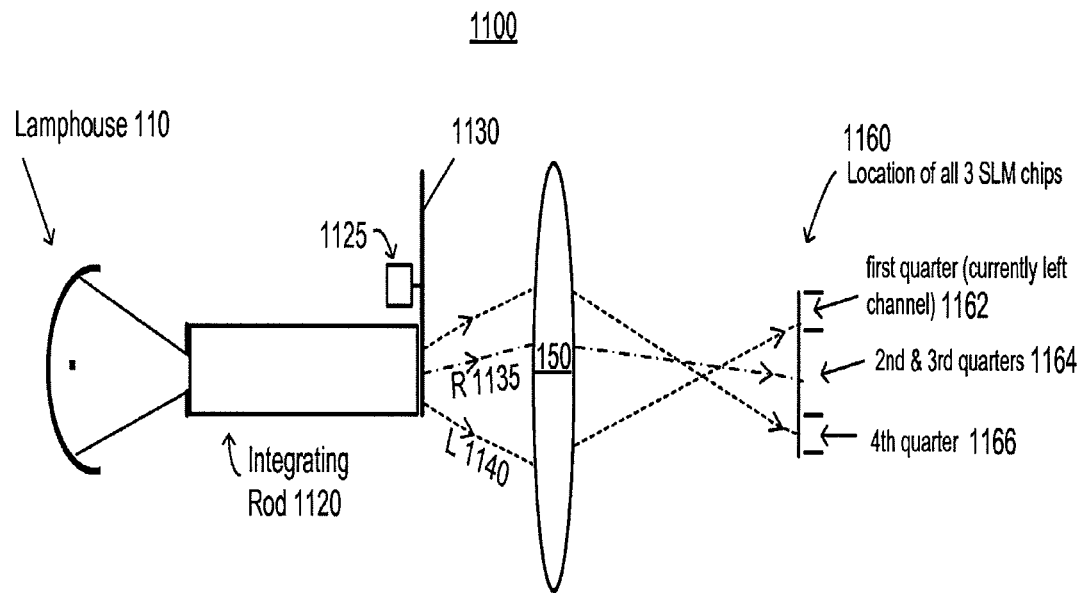
FIG. 11 is a diagram of a projector according to an embodiment of the present invention.

FIG. 11 is a diagram of a projector 1100 according to an embodiment of the present invention. A lamphouse 110 produces light that is homogenized by an integrating rod 1120. The homogenized light passes through a filter wheel 1130 that comprises, for example, one of the above described filter wheels (e.g., filter wheel 1030). In this example, the filtered light is then directed by optics 150 and falls onto 3 sections of Spatial Light Modulator (SLM) Chips (located at 1160) of the projector. The number of sections depends on the design of the filter. Here, the illustration shows three sections (first quarter 1162, 2nd & 3rd quarters 1164, and 4th quarter 1166) corresponding to the filter structure of filter wheel 1130.

The SLM chips each modulate, for example, one of three primary color lights (e.g., Red, Green, and Blue) which are then combined and projected onto a screen. For example, one of the SLM chips is a "red" SLM chip wherein a red component of the light filtered by filter 1130 illuminates the "red" SLM chip's modulation surface. The "red" SLM chip's modulation surface is energized with image data corresponding to the red content of an image to be displayed, that red content being broken down as described above according to the filter wheel's filter structure (e.g., in this example, a first quarter of the "red" SLM is energized with a first channel's red image content, 2nd & 3rd quarters of the "red" SLM are energized with a second channel's red image content, and a 4th quarter of the "red" SLM is energized with the first channel's red image content, each quarter also corresponding to quarters of the image to be projected). The same process occurs for each of the "green" and "blue" SLM chips except they are illuminated with their own correspondingly colored light and energized with a corresponding color image content. After each of the individually colored light beams are modulated, they are combined/re-combined and projected onto a viewing screen.

Figure 12:
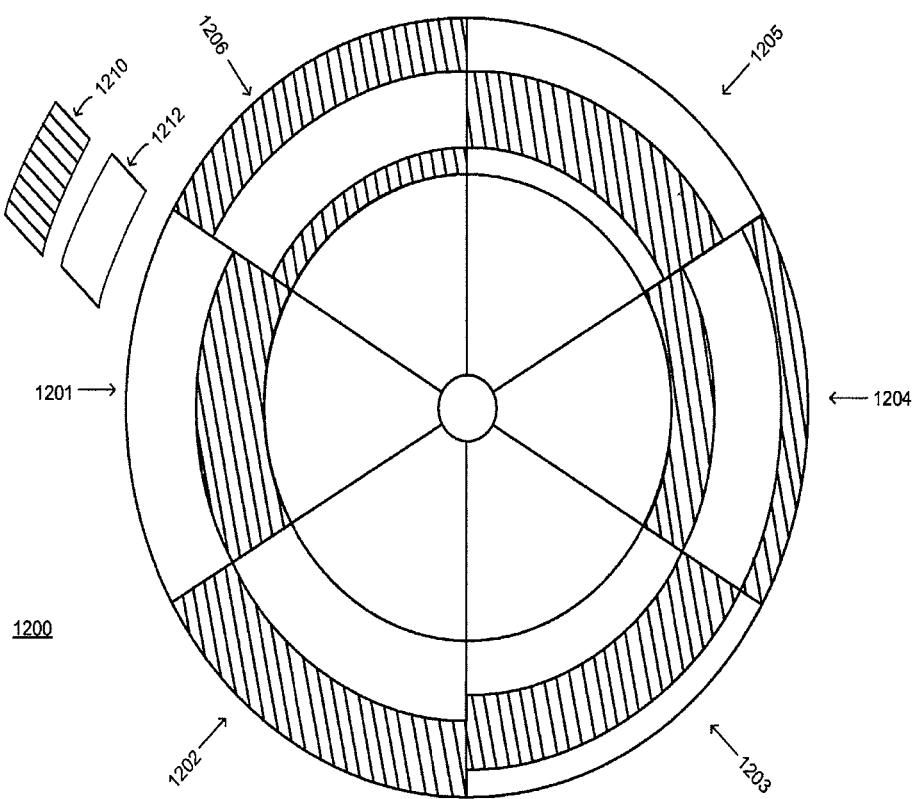
FIG. 12 is a diagram of a multi-sectored filter wheel according to an embodiment of the present invention.

FIG. 12 is a diagram of a multi-sectored filter wheel 1200 according to an embodiment of the present invention. The filter wheel 1200 comprises 6 sectors (1201 to 1206), each sector further comprising at least one filter 1210 and one filter 1212. The multi-sectored filter wheel may also be described as being a series of sectors each having concentric track shaped portions of filter material. Note that a sector may contain two filters of one type and one filter of another type, and that the number of sectors may be adjusted (e.g., 4 to 24 sectors). Other embodiments may provide for two or more filters of each type. Filters 1210 and 1212 comprise, for example, filters that pass and block wavelengths in each of left and right channels of light used in a 3D image projection. The filters may be, for example, spectral separation filters and/or polarization filters.

Each successive composite frame comprises, for example, vertical or horizontal line spacing apart. Since the server (which prepares modulation data to the modulators) has full image frame control, the frames can be tracked and synchronized to the filter wheel. Again this should produce an acceptable blurring of any mismatch. The number of sectors might range from 4 to 24 before it becomes impractical due to transitional losses. For each frame, they would differ from the previous frame to intersect the DMD chips at a significantly different vertical or horizontal line position. Thus 24 times per second the interface (blurry) line would move. The server would know the geometric positioning, and would be able to make the appropriate combination frame to synch to match and synchronize with the filter wheel.

In the illustrated embodiment of FIG. 12, the filter 1200 rotates (or is stepped via a stepper motor) and with each sector the relative locations of each of the different filter types changes. More importantly, the boundaries between the different filter types changes. Since the boundaries are a location where artifacts develop, the changing boundaries hide any such artifacts by moving the location of the artifacts in time with the changing of the areas being modulated for each channel. In essence, the artifacts are "blended" or "blurred" in with several different areas of the image making them less noticeable.

In another approach, the DLP projector may be modified so that it identifies a separate left and right composite frame 72 times per second (equivalent to single flash at 72 Hz), and would display first a left composite (1) and then a right composite (1), then a left composite (2), then a right composite (2), individually switching at 144 frames per second. This differs from 3× flash in that the same image is not repeated 3×. This is used to increase the number of times the boundary line changes.

Embodiments of the invention using a multi-sectored filter such as that in FIG. 12 may also be combined with averaging or weighted averaging of pixel lines at or near the boundaries. In addition to averaging or weighting of pixel values, other factors such as color transitions may be evaluated prior to deciding make any adjustment in pixel values (and different adjustments may be made for each color modulator). Another possibility is for existing projectors which are not capable of using the entire vertical of a DMD chip in a scope mode. In that case the boundary can be outside the visible image on the screen. This will allow recovery of some of the light lost in this mode.

Figure 13:
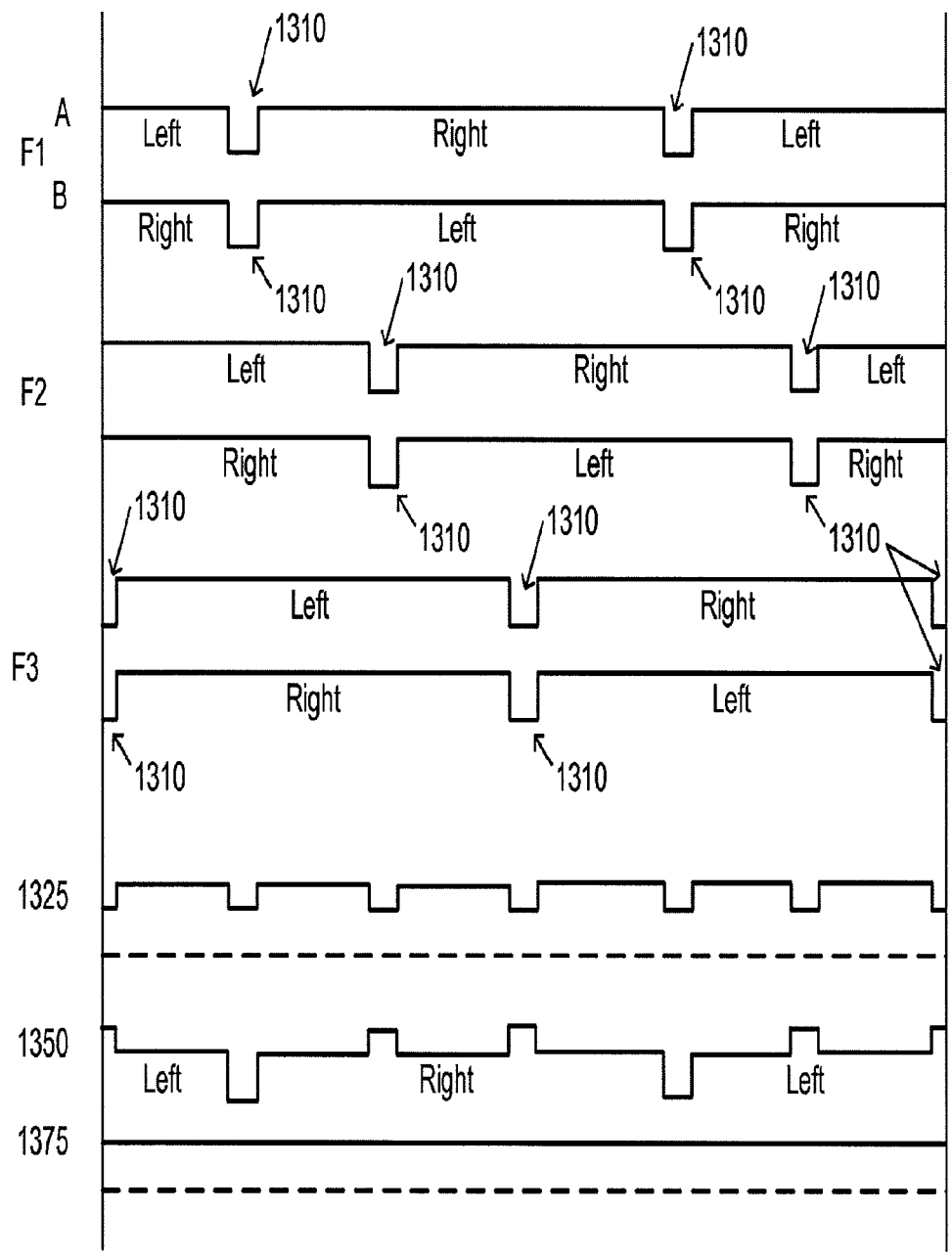
FIG. 13 is a one-dimensional view of a projector output for an exemplary embodiment of the present invention.

FIG. 13 is a one-dimensional view of a projector output and compensation scheme 1300 for an exemplary embodiment of the present invention. In this exemplary embodiment, the projector is in Single Flash Mode and the server is determining the L/R (Left/Right) content locations and feeding corresponding modulation data to modulators of the projector (via the projector's A/B inputs). An appropriate filter (e.g., a design similar to filter 1200) is rotated at a rate of once per 3 frames in a light path of the projector prior to illuminating the modulation surfaces of the modulators.

As illustrated, the A and B inputs for each frame F1, F2, and F3 provide both left and right content with blanking intervals 1310. The blanking intervals are located to include a boundary between the light filtered for each left and right channel. At 1325, the Left output is shown integrated over 3 frames. The integrated output shows a reduced luminance where the blanking intervals occurred during the three frames. To compensate, at 1350, a modified F1 A input is shown. The modified F1 A input provides additional illumination at the same locations as the integrated blanking intervals and provides compensation for the blanking intervals of frames F2 and F3. Increases in illumination may also be provided by the B input and other frames.

In essence, the portions of the frame that are blanked out (or portions of potential cross talk in the event blanking is not utilized) in one time instance are increased in brightness in another time instance or instances when the blanking is not present. In the illustrated embodiment, the increases in illumination in the F1 A input compensate for the diminution of illumination caused by the blanking intervals in the F2 and F3 frames. The diminution of illumination caused by the blanking intervals in the F1 frame may then be compensated by corresponding increases in illumination in Frame F2.

In other embodiments, the compensatory increases in illumination may occur across multiple frames (e.g., a current frame is ½ compensated in a previous frame and ½ compensated in a subsequent frame). The compensation may be divided in any way or spread out over any combination of frames (preferably neighboring or nearby frames are utilized for best results). The result, when appropriate compensation is applied for all frames and integrated over time, is shown at 1375, which represents an illumination that is approximately the amount of illumination across the frames as intended to be displayed according to the content of the frames.

As will be apparent to the ordinarily skilled artisan after review of the present invention, the techniques described herein, and particularly those techniques described for compensating artifacts (e.g., cross talk) may be used individually or combined in many different ways, or modified to suit any particular application. In addition, the filters described using concentric track shaped portions are themselves exemplary, and by accounting for the various physical and function differences from their use, other filter shapes within the various embodiments made be utilized.

Although the present invention has been described herein with reference to projectors using DLP modulators, other modulator types, including LCoS may be utilized. In describing preferred embodiments of the present invention, specific terminology is employed for the sake of clarity. However, the present invention is not intended to be limited to the specific terminology so selected, and it is to be understood that each specific element includes all technical equivalents which operate in a similar manner. Furthermore, the inventor recognizes that newly developed technologies not now known may also be substituted for the described parts and still not depart from the scope of the present invention. All other described items, including, but not limited to integrating rods, mirrors, filters, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings described herein, including, but not limited to, decoding video and preparing frame data for modulation, color processing, synchronizing filters, simultaneously energizing modulation chips with left and right channel image data corresponding to filtered light illuminating the chips, timing and synchronization of images projected in dual projection systems, and the display, storage, or communication of results according to the processes of the present invention.

The present invention may suitably comprise, consist of, or consist essentially of, any element (the various parts or features of the invention) and, their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A projection system comprising a light modulator configured to simultaneously modulate light bundles to form, on a modulation surface, at least one portion of a left channel image and at least one portion of a right channel image of a 3D projection, wherein each point of the modulation surface at the portions of the left and right channel images is illuminated with at least all three primary colors simultaneously, wherein: the modulation of the portions of the left channel image and the right channel image occur in instances; and during a first instance of modulation, a first area or areas of the light modulator modulate the portion(s) of the left channel image, and a second area or areas of the light modulator modulate the portion(s) of the right channel image, and, during a second instance of modulation, the first area or areas of the light modulator modulate the portion(s) of the right channel image, and the second area or areas of the light modulator modulate the portion(s) of the left channel image; a filter configured to, during the first instance, illuminate the first area or areas of the light modulator with a bundle or bundles of light having properties consistent with the left channel image and illuminate the second area or areas of the light modulator with a bundle or bundles of light having properties consistent with the right channel image, and during the second instance, illuminate the first area or areas of the light modulator with a bundle or bundles of light having properties consistent with the right channel image and illuminate the second area or areas of the light modulator with a bundle or bundles of light having properties consistent with the left channel image.

2. The projection system according to claim 1, further comprising a lighting system configured to illuminate the modulator with two different light bundles comprising a first light bundle having optical characteristics consistent with the left channel image and a second light bundle having optical characteristics consistent with the right channel image.

3. The projection system according to claim 1, further comprising a lighting system configured to illuminate the modulator with two different light bundles,
wherein the first light bundle simultaneously contains at least all three primary colors of the left channel image, and
wherein the second light bundle simultaneously contains at least all three primary colors of the right channel image.

4. The projection system according to claim 1, further comprising a lighting system configured to illuminate the modulator with two different light bundles comprising a first light bundle comprising a shape consistent with at least part of a shape of the portion(s) of the left channel image modulated by the light modulator, and a second light bundle comprising a shape consistent with at least part of a shape of the portion(s) of the right channel image modulated by the light modulator.

5. The projection system according to claim 1, wherein the first area or areas and the second area or areas correspond to first and second areas of the right and left channel images to be modulated.

6. The projection system according to claim 1, wherein the filter comprises three passbands of visible light, a first passband configured to pass only a first color of light, a second passband configured to pass two spectrum adjacent colors of light comprising the first color of light and a second color of light, and a third passband configured to pass two spectrum adjacent colors of light comprising the second color of light and a third color of light.

7. The projection system according to claim 1, wherein the filter comprises a filter wheel in a light path of the projector having a first part configured to produce the bundles of light illuminating the light modulator during the first instance and a second part configured to produce the bundles of light illuminating the light modulator during the second instance.

8. The projection system according to claim 7, wherein the first part of the filter comprises passbands of wavelengths of approximately 400 to 440 nm, 484 to 498 nm, 514 to 528 nm, 567 to 581 nm, and 610 to 623 nm.

9. The projection system according to claim 7, wherein the second part of the filter comprises passbands of wavelengths of approximately 455 to 471 nm, 539 to 556 nm, and 634 to 700 nm.

10. A dual projection system, comprising a first projector and a second projector, each according to claim 9 and each configured to simultaneously transmit full color portions of first and second channel images and re-cycle portions of spectrum not used by a channel by re-directing the unused portions of spectrum to the other channel.

11. The dual projection system according to claim 10, wherein the unused portions of spectrum are re-directed to the other channel in the same projector.

12. The projection system according to claim 7, further comprising a stepper motor configured to drive the filter wheel such that the first part of the filter wheel is aligned in the light path during the first instance and the second part of the filter wheel is aligned in the light path during the second instance.

13. The projection system according to claim 1, wherein the filter comprises sections of concentric track shaped filter portions configured for use in the left and the right channels.

14. The projection system according to claim 13, wherein the concentric track shaped filter portions comprise spectral separation filters.

15. The projection system according to claim 14, wherein the spectral separation filters comprise a set of first channel passbands configured to pass light, a set of second channel passbands configured to pass light, and a set of guard bands configured to block light between adjacent passbands of different channels.

16. The projection system according to claim 15, wherein the spectral separation filters further comprise at least one notch band between adjacent colors of a same channel configured to block light between the adjacent colors.

17. The projection system according to claim 15, wherein at least one of the passbands passing spectrum adjacent colors of light includes a notch that separates the spectrum adjacent colors and is not passed by the passband.

18. The projection system according to claim 13, further comprising an integrating rod positioned between the filter wheel and a light source, wherein the integrating rod comprises a minor configured to reflect portions of light not passed by a first of the spectrally separated filters and portions of light not passed by the second set of spectrally separated filters back toward the filters.

19. The projection system according to claim 13, wherein the projector is part of a system including at least one pair of spectrally separated eye filters.

* * * * *